US011030868B2

(12) United States Patent
Buttolo et al.

(10) Patent No.: US 11,030,868 B2
(45) Date of Patent: Jun. 8, 2021

(54) OBJECT DETECTION AND MANAGEMENT

(71) Applicant: Ford Global Technologies, LLC, Dearborn, MI (US)

(72) Inventors: Pietro Buttolo, Dearborn Heights, MI (US); Stuart C. Salter, White Lake, MI (US); Paul Kenneth Dellock, Northville, MI (US); Annette L. Huebner, White Lake, MI (US); James Stewart Rankin, II, Novi, MI (US)

(73) Assignee: FORD GLOBAL TECHNOLOGIES, LLC, Dearborn, MI (US)

(*) Notice: Subject to any disclaimer, the term of this patent is extended or adjusted under 35 U.S.C. 154(b) by 28 days.

(21) Appl. No.: 16/496,485

(22) PCT Filed: Mar. 24, 2017

(86) PCT No.: PCT/US2017/023966
§ 371 (c)(1),
(2) Date: Sep. 23, 2019

(87) PCT Pub. No.: WO2018/174894
PCT Pub. Date: Sep. 27, 2018

(65) Prior Publication Data
US 2021/0049878 A1    Feb. 18, 2021

(51) Int. Cl.
*G08B 13/14* (2006.01)
*H04W 4/40* (2018.01)
*G01S 19/14* (2010.01)
*G06K 9/00* (2006.01)
*G06Q 10/08* (2012.01)
*G08B 13/10* (2006.01)
(Continued)

(52) U.S. Cl.
CPC ........ *G08B 13/1472* (2013.01); *G01S 19/14* (2013.01); *G06K 9/00771* (2013.01); *G06Q 10/0833* (2013.01); *G08B 13/10* (2013.01); *G08B 25/10* (2013.01); *H04W 4/02* (2013.01); *H04W 4/40* (2018.02); *G06K 2209/21* (2013.01)

(58) Field of Classification Search
None
See application file for complete search history.

(56) References Cited

U.S. PATENT DOCUMENTS 9,359,074 B2   6/2016   Ganesh et al.
9,469,476 B1  10/2016   Ashoori et al.
(Continued)

FOREIGN PATENT DOCUMENTS

CN    203539051 U    4/2014

OTHER PUBLICATIONS

"Call Me a "Doormat" If You Like, But I'm the SmartMat", http://inventorspot.com/articles/call-me-doormat-if-you-im-smartmat.
(Continued)

*Primary Examiner* — Adolf Dsouza
(74) *Attorney, Agent, or Firm* — Brandon Hicks; Bejin Bieneman PLC

(57) ABSTRACT

A mat includes a receiving surface, a transceiver, and a computer. The computer is programmed to cause the transceiver to transmit a beacon, including one or both of a mat identifier and location, upon detecting an approaching delivery vehicle. The computer is programmed to, upon detecting placement of an object on the receiving surface, transmit a confirmation message.

18 Claims, 7 Drawing Sheets

(51) Int. Cl.
G08B 25/10 (2006.01)
H04W 4/02 (2018.01)

(56) References Cited

U.S. PATENT DOCUMENTS

| | | | |
|---|---|---|---|
| 9,508,239 B1 | 11/2016 | Harrison et al. | |
| 2015/0301150 A1* | 10/2015 | Stuckman | G01S 1/7034 |
| | | | 342/407 |
| 2015/0310381 A1* | 10/2015 | Lyman | G06Q 10/083 |
| | | | 705/330 |
| 2016/0343220 A1* | 11/2016 | Grabham | G08B 25/08 |
| 2017/0032637 A1* | 2/2017 | Harrison | G06Q 10/0833 |

OTHER PUBLICATIONS

International Search Report and Written Opinion dated Jul. 17, 2017 re Appl. No. PCT/US2017/23966.

* cited by examiner

OBJECT DETECTION AND MANAGEMENT

BACKGROUND

A navigation system of a delivery truck may locate a destination address but may lack an ability to identify a suitable location to place a delivered item. For example, at a destination address, a delivery may be expected at a porch, at a backyard door, a front door, breezeway, etc. In another example, a delivered item at a destination may be exposed to risks such as theft. Moreover, once an object such as a package is delivered, technology is lacking to avoid or reduce a risk of theft. For example, current technical architectures may not provide for efficient mechanisms to confirm object delivery and/or user pickup.

DETAILED DESCRIPTION

Introduction

Figure 1:
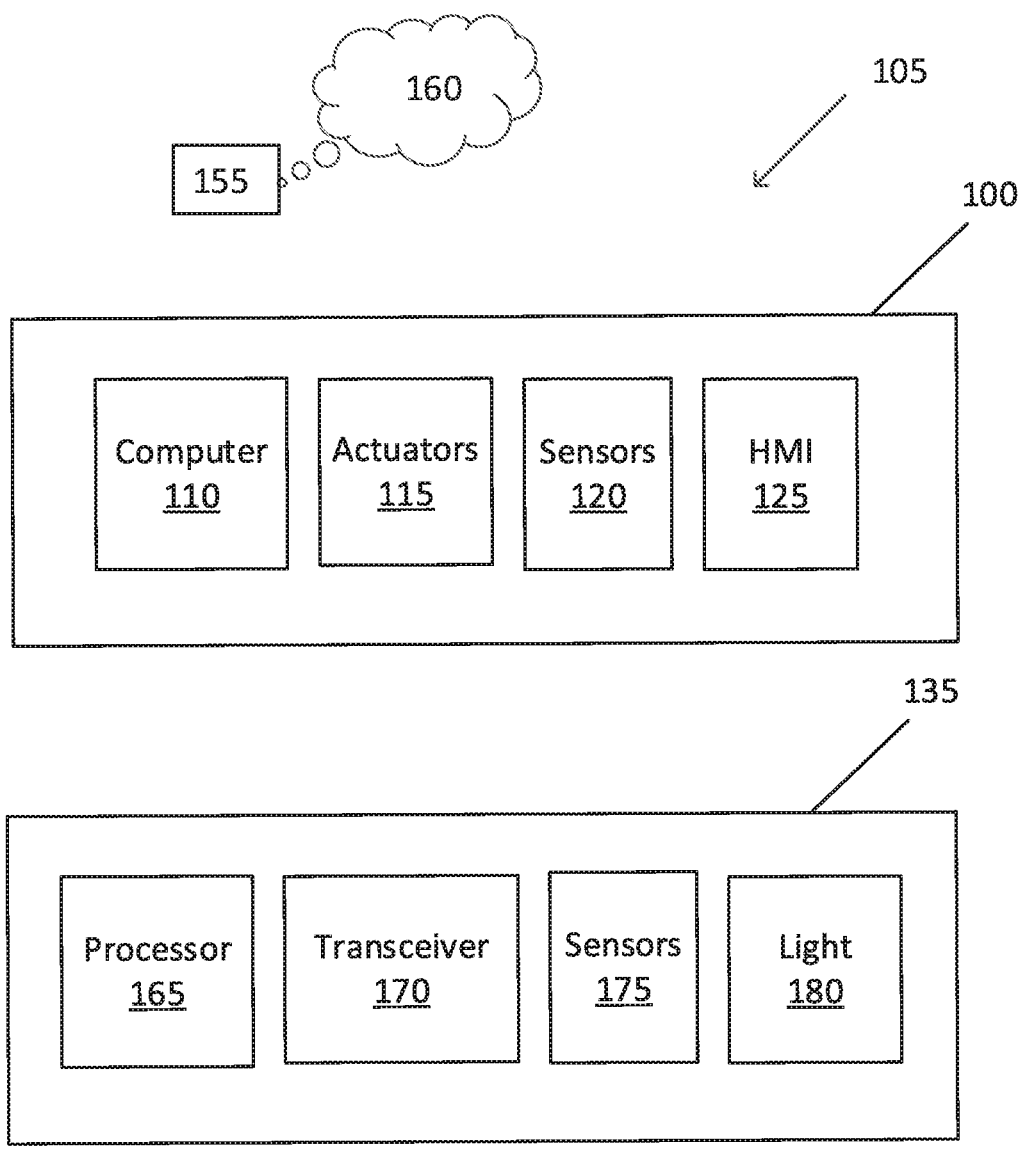
FIG. 1 is a block diagram of an example object detection system including example vehicle and an example mat.

Disclosed herein is an object receiving mat that includes a receiving surface, a transceiver, and a computer. The computer is programmed to transmit a beacon, including one or both of a mat identifier and location, upon detecting an approaching delivery vehicle. The processor is further programmed to transmit a confirmation message, upon detecting placement of an object on the receiving surface.

The computer may be further programmed to transmit a pickup message upon detecting pickup of the object from the receiving surface.

The pickup message may indicate that the pickup of the object was or was not authorized. The computer may be further programmed to determine that the pickup of the object is authorized based on at least one of image data including an authorized user and received wireless data indicating that an authorized wireless sender is within a predetermined distance of the mat.

The computer may be further programmed to receive, via the transceiver, a wireless signal including an identifier of a mobile device and determine a presence of the mobile device within a predetermined distance of the mat. The computer may be further programmed to store the identifier of the mobile device upon determining that the object is picked up.

The transmitted beacon may further include data including a time interval in which a delivery of the object is expected.

The confirmation message may include at least one of a size, shape, weight, identification number, and image of the object.

The transmitted instruction may further include route information to access the mat.

The computer may be further programmed to identify and store the mat location data based on location coordinates received from a remote computer.

The mat may further include a mat light, and the computer may be further programmed to actuate a mat light to illuminate upon placing the object on the mat.

The computer may be further programmed to transmit the beacon, including one or both of a second mat identifier and location, upon detecting an approaching delivery vehicle.

Further disclosed herein is a method that comprises causing a transceiver of a mat to transmit a beacon, including one or both of a mat identifier and location, upon detecting an approaching delivery vehicle, and upon detecting placement of an object on a receiving surface of the mat, transmitting a confirmation message.

The method may further include transmitting a pickup message, upon detecting pickup of the object from the receiving surface. The pickup message may indicate that the pickup of the object was or was not authorized.

The method may further include determining that the pickup of the object is authorized based on at least one of image data including an authorized user and received wireless data indicating that an authorized wireless sender is within a predetermined distance of the mat.

The method may further include receiving, via the transceiver, a wireless signal including an identifier of a mobile device and determining a presence of the mobile device within a predetermined distance of the mat. The method may further include storing the identifier of the mobile device upon determining that the object is picked up.

The transmitted beacon may further include data including a time interval in which a delivery of the object is expected.

The confirmation message may further include at least one of a size, shape, weight, identification number, and image of the object.

The transmitted instruction may further include route information to access the mat.

The method may further include identifying and storing the mat location data based on location coordinates received from a remote computer.

Further disclosed is a computing device programmed to execute the any of the above method steps.

Yet further disclosed is a computer program product, comprising a computer readable medium storing instructions executable by a computer processor, to execute any of the above method steps.

Exemplary System Elements

Figure 2:
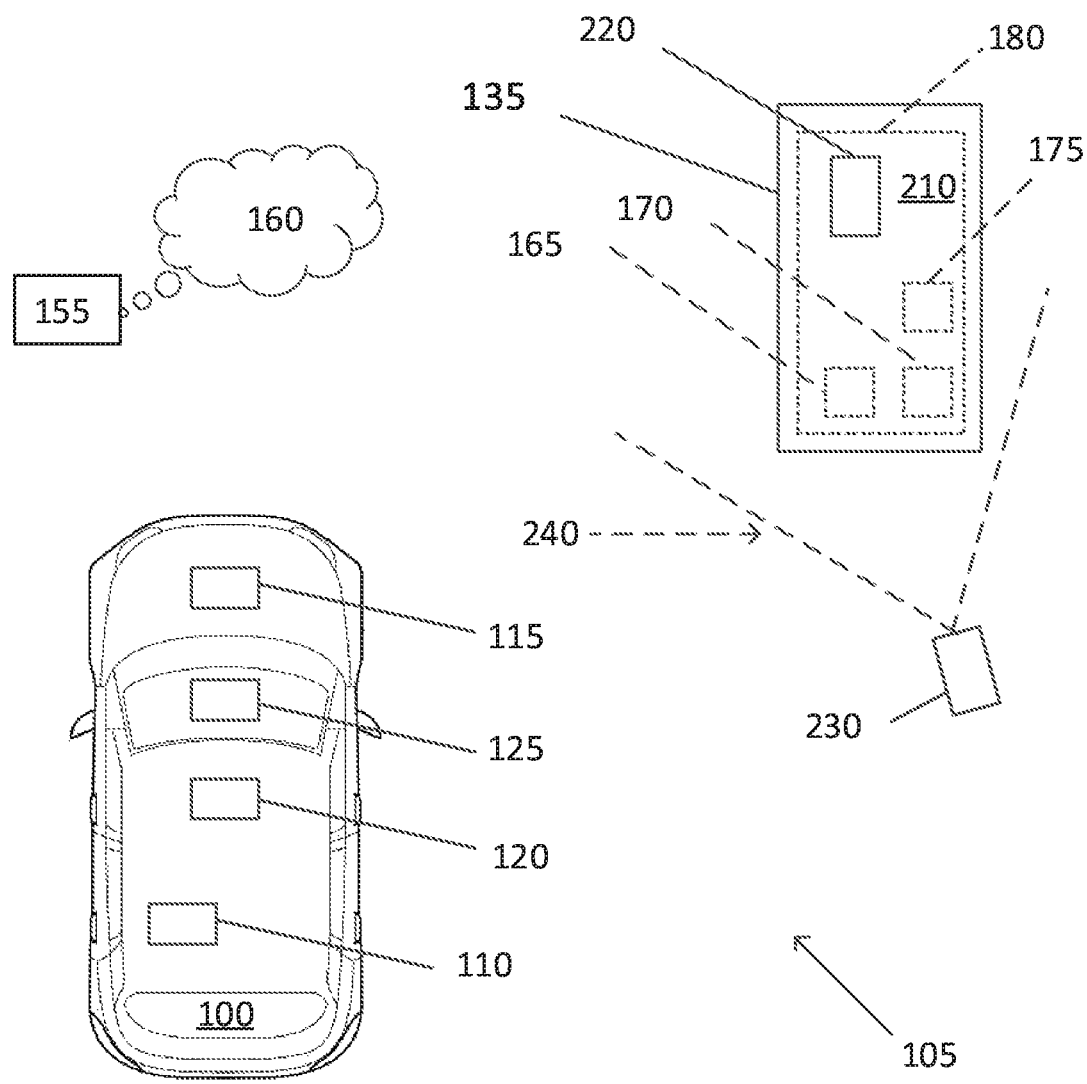
FIG. 2 shows the vehicle of FIG. 1 delivering an object to the mat.

FIGS. 1-2 illustrate an example object detection system 105 including an example vehicle 100 and an example mat 135. The vehicle 100 may be powered in a variety of ways, e.g., with an electric motor and/or internal combustion engine. The vehicle 100 may include any automobile such as a car, a truck, a sport utility vehicle, a crossover vehicle, a van, a minivan, etc. The vehicle 100 may include a computer 110, actuator(s) 115, sensor(s) 120, and a human machine interface (HMI) 125. In some possible approaches, as discussed below, the vehicle 100 is an autonomous vehicle 100 configured to operate in an autonomous (e.g., driverless) mode, a partially autonomous mode, and/or a non-autonomous mode.

The computer 110 includes a processor and a memory such as are known. The memory includes one or more forms of computer-readable media, and stores instructions executable by the computer 110 for performing various operations, including as disclosed herein.

The computer 110 may operate the vehicle 100 in an autonomous mode, a semi-autonomous mode, or a non-autonomous mode. For purposes of this disclosure, an autonomous mode is defined as one in which each of vehicle 100 propulsion, braking, and steering are controlled by the computer 110; in a semi-autonomous mode the computer controls one or two of vehicle 100 propulsion, braking, and steering; in a non-autonomous mode, an operator controls the vehicle 100 propulsion, braking, and steering.

The computer 110 may include programming to operate one or more of land vehicle 100 brakes, propulsion (e.g., control acceleration in the vehicle 100 by controlling one or more of an internal combustion engine, electric motor, hybrid engine, etc.), steering, climate control, interior and/or exterior lights, etc., as well as to determine whether and when the computer 110, as opposed to a human operator, is to control such operations. Additionally, the computer 110 may be programmed to determine whether and when a human operator is to control such operations.

The computer 110 may include or be communicatively coupled to, e.g., via a vehicle 100 network, e.g., including a communications bus as described further below, more than one processor, e.g., controllers or the like included in the vehicle 100 for monitoring and/or controlling various vehicle controllers, e.g., a powertrain controller, a brake controller, a steering controller, etc. The computer 110 is generally arranged for communications on a vehicle 100 communication network that can include a bus in the vehicle 100 such as a controller area network (CAN) or the like, and/or other wired and/or wireless mechanisms.

Via a communication network of the vehicle 100, the computer 110 may transmit messages to various devices in the vehicle 100 and/or receive messages from the various devices, e.g., an actuator 115, an HMI 125, etc. Alternatively or additionally, in cases where the computer 110 actually comprises multiple devices, the vehicle communication network may be used for communications between devices represented as the computer 110 in this disclosure.

The actuators 115 of the vehicle 100 are implemented via circuits, chips, or other electronic and/or mechanical components that can actuate various vehicle 100 subsystems in accordance with appropriate control signals, as is known. The actuators 115 may be used to control vehicle systems such as braking, acceleration, and/or steering of the vehicles 100.

The sensors 120 of the vehicle 100 may include a variety of devices known to provide data via the vehicle communications bus. For example, the sensors 120 may include one or more camera, radar, infrared, and/or Light Detection And Ranging (LIDAR) sensors 120 disposed in the vehicle 100 and/or on the vehicle 100 providing data encompassing at least some of the vehicle exterior. The data may be received by the computer 110 through a suitable interface such as in known. A LIDAR sensor 120 disposed, e.g., on a top of the vehicle 100, may provide object data including relative locations, sizes, and shapes of objects such as other vehicles surrounding the vehicle 100. The computer 110 may receive the object data and operate the vehicle 100 in an autonomous and/or semi-autonomous mode based at least in part on the received object data.

The vehicle 100 may include a Global Positioning System (GPS) sensor 120 configured to determine coordinates of a current location of the vehicle 100. The computer 110 may be programed, using known navigation techniques, to identify a route from the current location to a selected destination, as well as display a map and present driving directions to the selected destination via, e.g., the HMI 125.

In addition, the computer 110 may be configured for communicating through a vehicle-to-infrastructure (V-to-I) interface with other vehicles 100, mat(s) 135, and/or a remote computer 155 via a network 160. The network 160 represents one or more mechanisms by which the computer 110 and the remote computer 155 may communicate with each other, and may be one or more of various wired or wireless communication mechanisms, including any desired combination of wired (e.g., cable and fiber) and/or wireless (e.g., cellular, wireless, satellite, microwave and radio frequency) communication mechanisms and any desired network topology (or topologies when multiple communication mechanisms are utilized). Exemplary communication networks 160 include wireless communication networks (e.g., using one or more of cellular, Bluetooth, IEEE 802.11, etc.), dedicated short range communications (DSRC), local area networks (LAN) and/or wide area networks (WAN), including the Internet, providing data communication services. The network 160 may further include one or more telecommunication protocols, e.g., cellular technologies such as 3G, 4G, Long-Term Evolution (LTE), etc., Bluetooth®, Bluetooth Low Energy®, WiFi, etc.

The HMI 125 presents information to and receives information from an occupant of the vehicle 100. The HMI 125 may be located, e.g., on an instrument panel in a passenger cabin of the vehicle 100, or one or more other locations accessible by the occupant. The HMI 125 may include dials, digital readouts, screens such as a touch-sensitive display screen, speakers, and so on for providing information to the occupant. The HMI 125 may include buttons, knobs, keypads, microphone, and so on for receiving information from the occupant. As discussed below, the vehicle 100 computer 110 may be programmed to output instructions to a vehicle 100 user including a path to a mat 135 location for delivering an object 220 transported by the vehicle 100.

The mat 135 includes a receiving surface 210 that may have a circular, rectangular, triangular, or any other shape. The mat 135 may be formed of a textile, fiber, plastic, rubber, etc. The mat 135 typically has a rectangular cross-sectional shape, and may have a thickness, e.g., 1-3 centimeters, to accommodate components as described herein. A mat 135 is typically placed before a door or other entrance to a building e.g., as a door mat for people arriving, to wipe their shoes on before entering a home, office, etc. An object, e.g., a delivered package shipped in response to a user's order, may be placed on the receiving surface 210.

The mat 135 may further include various circuits, chips, or other electronic and/or electrical components that can detect placement of an object 210 on the receiving surface 210 and can communicate with the vehicle 100 and/or the remote computer 155. The mat 135 electrical and/or electronic components may be disposed inside the mat 135, e.g., mounted between layers of protective material such as rubber or the like. The mat 135 may further include a transceiver 170 and a computer 165. The computer 165 may be programmed to transmit a beacon, i.e., a wireless message providing notification that the mat 135 is present, e.g., including a mat 135 identifier and/or a mat 135 location, upon detecting an approaching delivery vehicle 100. The mat 135 computer 165 may then transmit a confirmation message upon detecting placement of an object 220 on the receiving surface 210. Thus, advantageously, as discussed below, the transmitted beacon may assist the delivery of the object 220 to the receiving surface 210.

"Beacon" in the context of present disclosure refers to a wireless signal communication based on a wireless protocol implemented by a wireless network 160, as discussed above.

In one example, the mat 135 computer 165 may be programmed to detect an approaching of the vehicle 100, e.g., a package delivery truck, based on a beacon received from the vehicle 100. The computer 165 may determine a distance between the vehicle 100 and the mat 135 based on, e.g., location coordinates included in the received beacon, and/or a Free Space Path Loss (FSPL) technique as discussed below. For example, the computer 165 may be programmed to determine that the vehicle 100 is approaching upon determining that a distance from the mat 135 to the vehicle 100 is less than a predetermined distance threshold, e.g., 100 meters. Additionally or alternatively, the computer 165 may be programmed to determine that the vehicle 100 is approaching based on delivery destination location data, e.g., coordinates, transmitted by the vehicle 100 transceiver. For example, the computer 165 may be programmed to determine that the vehicle 100 is approaching upon receiving a beacon from the vehicle 100 including an address associated with the mat 135, e.g., street and house number, and/or apartment unit number.

The mat 135 may include illumination light(s) 180, e.g. light emitting diodes (LEDs), e.g., embedded around a perimeter of the mat 135. The computer 165 may be programmed to activate the lights 180 upon detecting the placement of the object 220 on the mat 135.

The mat 135 may include one or more sensors 175 to detect and/or identify an object 220 on the receiving surface 210. For example, the sensors 175 may include a weight sensor 175 such as a strain gauge to determine a weight of an object 220 placed on the mat 135. Additionally or alternatively, the mat 135 sensors 175 may include capacitive sensors 175 to detect a presence of an object 220 on the receiving surface 210. As another example, the sensors 175 may include radio frequency identification (RFID) sensors 175 to receive an identification, e.g., RFID code, of the delivered object 220. The computer 165 may be programmed to identify the object 220 based on the identifier received from the RFID sensor 175. The computer 165 may be programmed to receive object 220 data including size, shape, weight, identification number, and picture of the object 220, e.g., from a remote computer 155 via the network 160. In one example, the computer 165 may receive an RFID of the object 220 via the transceiver 170, transmit a request for information including the RFID to the remote computer 155, and receive object 220 data such as picture, shape, etc. from the remote computer 155.

The computer 165 may be programmed to detect the placement of an object 220 on the receiving surface 210 based on data received from the mat 135 sensors 175. For example, the computer 165 may be programmed to determine that an object 220 is received upon determining that an applied weight on the receiving surface 210 exceeds a minimum weight threshold, e.g., 500 grams. Additionally, e.g., to differentiate from a person temporarily standing on the mat 135, the computer 110 may be programmed to detect the placement of the object 220 upon determining that the applied weight is unchanged for at least a minimum time threshold, e.g., 1 minute. Additionally or alternatively, the computer 110 may be programmed to detect the placement of the object 220 based on image data received from a camera 230 with a field of view 240 that includes the mat 135 receiving surface 210. For example, the computer 165 may be programmed to detect, using known image processing techniques, an object 220 on the receiving surface 210 included in image data received from the camera 230.

Figure 3:
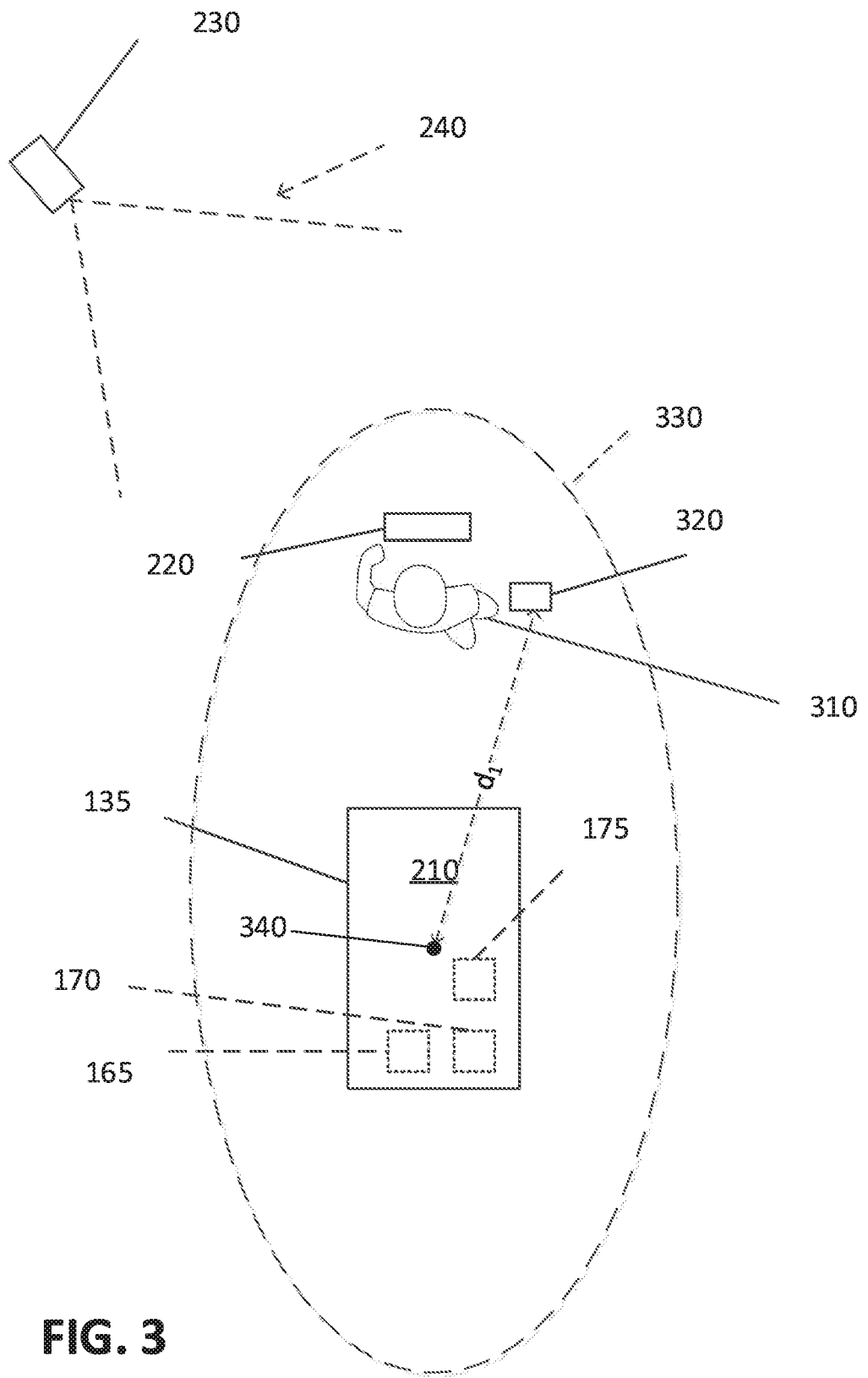
FIG. 3 shows the mat of FIGS. 1-2 and a user picking up an object from the mat.

In one example, shown in FIG. 3, the computer 165 may be programmed to transmit a "pickup" message, i.e., a message confirming that an object 220 is no longer on the mat 135 upon detecting pickup of the object 220 from the receiving surface 210. For example, the computer 165 may be programmed to transmit a pickup message to a remote computer 155, e.g., home security system computer, cloud server, etc. The pickup message may include various object 220 data such as an RFID code, weight information, etc. Additionally or alternatively, the computer 165 may be programmed to transmit a pickup message including image data based on data received from the camera 230. The image data may include an image of the object 220, an image of a user 310 that picked up the object 220.

The computer 165 may be programmed to detect the pickup of the object 220 based on determining a reduction of applied weight on the receiving surface 210. In one example, the computer 165 may be programmed to store the weight information of the object 220 upon detecting the placement of the object 220. The computer 165 may be programmed to detect the pickup upon determining that the weight applied to the receiving surface reduces more than a maxim weight reduction threshold, e.g., 100 grams. In one example, multiple objects 220 may be placed on the receiving surface 210 with an accumulative weight of 5 kilograms. Upon picking up one of the objects 220 that has a weight of 300 grams, the computer 165 may be programmed to detect the pickup of at least one object based on determining that a weight reduction of 300 grams exceeds the maximum weight reduction threshold of 100 grams.

In another example, the transmitted pickup message may include information determining whether the pickup of the object 220 was authorized. For example, the computer 165 may be programmed to transmit the pickup message to a remote computer 155, e.g., a mobile device of a home owner, associated with the mat 135, including information determining whether the pickup of the object 220 was authorized. In one example, computer 165 may be programmed to determine whether the pickup of the object 220 was authorized based on determining that the image data includes an authorized user 310 and/or based upon received wireless data indicating that an authorized wireless sender device 320 was within an area 330, e.g., a predetermined distance (e.g., 5 meters) of the mat 135. The computer 165 may be programmed to determine whether the pickup of the object 220 was authorized based on identifying the authorized user 310 in the received image data using known image processing techniques, e.g., facial recognition. The computer 165 may alternatively or additionally be programmed to determine whether the pickup was authorized based on received wireless signal of a mobile device 320 that is associated with an authorized user 310. In one example, the computer 165 may be programmed to determine whether the mobile device 320 is within the area 330 based on location coordinates received from the mobile device 320.

In another example, the computer 165 may be programmed to determine a distance $d_1$ of the mobile device 320 to the mat 135 center 340, e.g., using techniques such as Free Space Path Loss (FSPL), which is known. The computer 110 may be programmed to determine a strength of a wireless signal of a mobile device 320 based on data received from the transceiver 170. Based on FSPL, a loss (weakening) of an electromagnetic signal over a straight path between a transmitter, e.g., the mobile device 320, and a receiver, e.g., the transceiver 170, may be proportional to the square of the distance (or distance $d_1$) between the transmitter and receiver, and also proportional to the square of a frequency of the radio signal.

For example, the computer 110 may be programmed to determine the distance $d_1$ upon determining the frequency of signals transmitted by the mobile device 320 and the loss of the signal received by the transceiver 170. The computer 110 may be programmed to determine the frequency of the received signal based on a frequency associated to a used communication protocol and/or using known Digital Signal Processing (DSP) techniques. The computer 165 may be programed to determine a loss of the received signal based on determining the output power of the mobile device 320 and the signal strength of the received signal based on data received from the transceiver 170.

An object 220 placed on the receiving surface 210 may be accessible to an unauthorized user 310. An unauthorized user 310 my carry a mobile device 320. In one example, e.g., to provide a possibility of identifying an unauthorized user 310, the computer 165 may record the identifier, e.g., a Bluetooth™ identifier, of the mobile devices 320 proximate to the mat 135 when a pickup is detected. For example, the computer programmed to receive, via the transceiver 170, a wireless signal including an identifier of a mobile device 320 and determine a presence of the mobile device 320 within a predetermined distance of the mat 135. The computer 165 may be further programmed to store the identifier of the mobile device 320 upon determining that the object 220 is picked up. In one example, a remote computer 155 may be programmed to identify an unauthorized user 310 that picked up the object 220 based on the stored identifier of the mobile device(s) 320 and/or stored image data including the unauthorized user 310.

In one example, the transmitted beacon may further include data including a time interval in which a delivery of the object 220 is expected. For example, the computer 165 may determine the time interval based on calendar information of the authorized user 310 indicating when the authorized user 310 is available to pick up the object 220. For example, the computer 165 may be programmed to receive availability information of the authorized user 310 from the authorized user 310 mobile device 320, the remote computer 155, etc. The vehicle 100 computer 110 may be programmed to determine a vehicle 100 route based on the received time interval. The computer 110 may be programmed to plan a route to deliver other shipping items such that a time of delivery of the object 220 to the mat 135 is within the received time interval. Thus, advantageously, an authorized user 310 can pick up the object 220 shortly after delivery. Thus, a likelihood of an access of an unauthorized user 310 to the delivered object 220 may be reduced compared to when the delivered object 220 is left on the mat 135 for an extended time.

Figure 4:
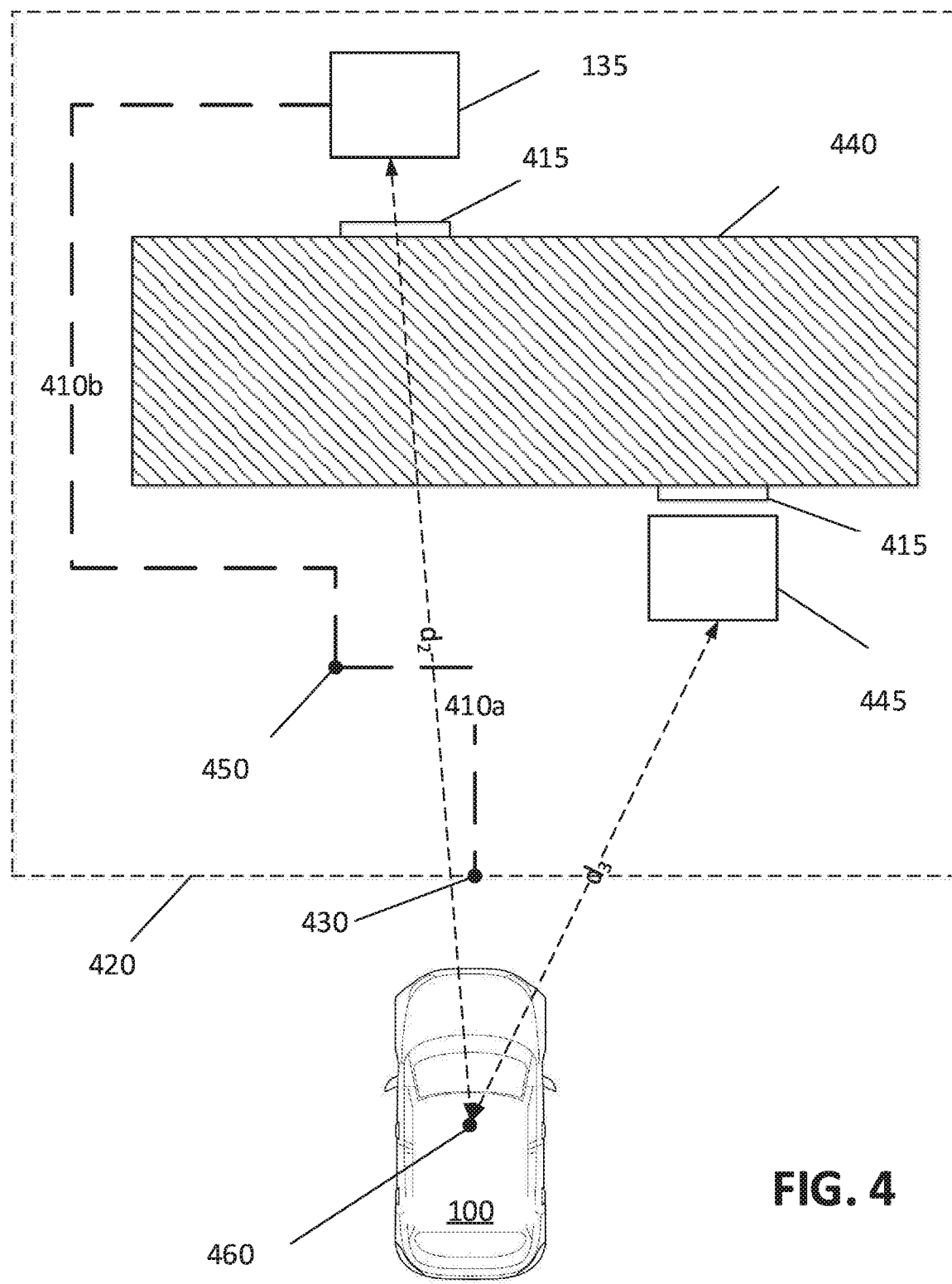
FIG. 4 is a diagram showing a vehicle, mats, and an object delivered to a mat.

Finding a delivery location of an object 220 at a destination address may be challenging. For example, map data provided to the vehicle 100 computer 110 may lack information regarding roads and paths inside an apartment complex or location of multiple entrances of a building. In one example shown in FIG. 4, the transmitted beacon may include predetermined route information to access the mat 135. For example, the predetermined route information may include navigation instructions to navigate a delivery of the object 220 within an area 420 around the mat 135 to access the mat 135. In one example, the area 420 is a private property around a destination address associated with a building 440 that is not covered by map data provided to the vehicle 100 computer 110. The predetermined route may include location coordinates of roads 410a, e.g., a driveway, and or walkable paths 410b within the area 420. In one example, the predetermined route may include a nearest location 430 to the destination address (the building 440) that is covered by map data provided to the vehicle 100 computer 110. The predetermined route may further include a route 410a that can be driven by the vehicle 100 and/or a walkable route 410b to the mat 135. For example, based on the received predetermined route information, the vehicle 100 computer 110 may be programmed to navigate the vehicle 100 via the route 410a to a location 450, e.g., a nearest location to the destination accessible by the vehicle 100, and then provide navigation instructions to a vehicle 100 user, e.g., a person, a robot, etc., to carry the object 220 to the mat 135 via the route 410b.

As discussed above, the mat 135 computer 165 may transmit a beacon via the transceiver 170 to the vehicle 100. In one example shown in FIG. 4, a vehicle 100 may not receive the transmitted beacon from a first mat 135 transceiver 170, e.g., because a distance $d_2$ to the vehicle 100 center 460 is greater than an access range of the first mat 135 transceiver 170 and/or the building 440 weaken the transmitted beacon from the first mat 135. In one example, a second mat 445 computer 165 with a distance $d_3$ to the vehicle 100 center 460 (that is within the range of the second mat 445 transceiver 170) may be able to communicate with the vehicle 100. The second mat 445 computer 165 may be programmed to transmit a beacon, including one or both of a second mat 445 identifier and location, upon detecting an approaching delivery vehicle 100. For example, the building 440 may have two entries 415 (e.g., front and back entrances) and the first mat 135 and the second mat 445 are placed next to the entries 415. Based on an input from authorized user 310, the object 220 is expected to be delivered to the mat 135 that may lack an ability to communicate with the vehicle 100 directly. The second mat 445 computer 165 may then transmit a beacon to the vehicle 100 on behalf of the first mat 135. "On behalf of" in this context means that the transmitted beacon includes the first mat 135 identifier and/or location coordinates. In another example, the second mat 445 computer 165 forwards messages between the vehicle 100 and the first mat 135.

As discussed above, a mat 135 computer 165 may transmit location coordinates of the mat 135. The mat 135 computer 165 may be programmed to identify and store the mat location data based on received location coordinates from the remote computer 155. In one example, the mat 135 computer 165 may be programmed to receive location coordinates associated with the mat 135 from, e.g., a remote computer 155. In another example, the mat may include a GPS sensor 175.

The mat 135 computer 165 may be programmed to receive and store information such as authorized user 310 biometrical data, e.g., image, mobile device 320 identifier, address associated with the mat 135, etc.

Processing

Figure 5A:
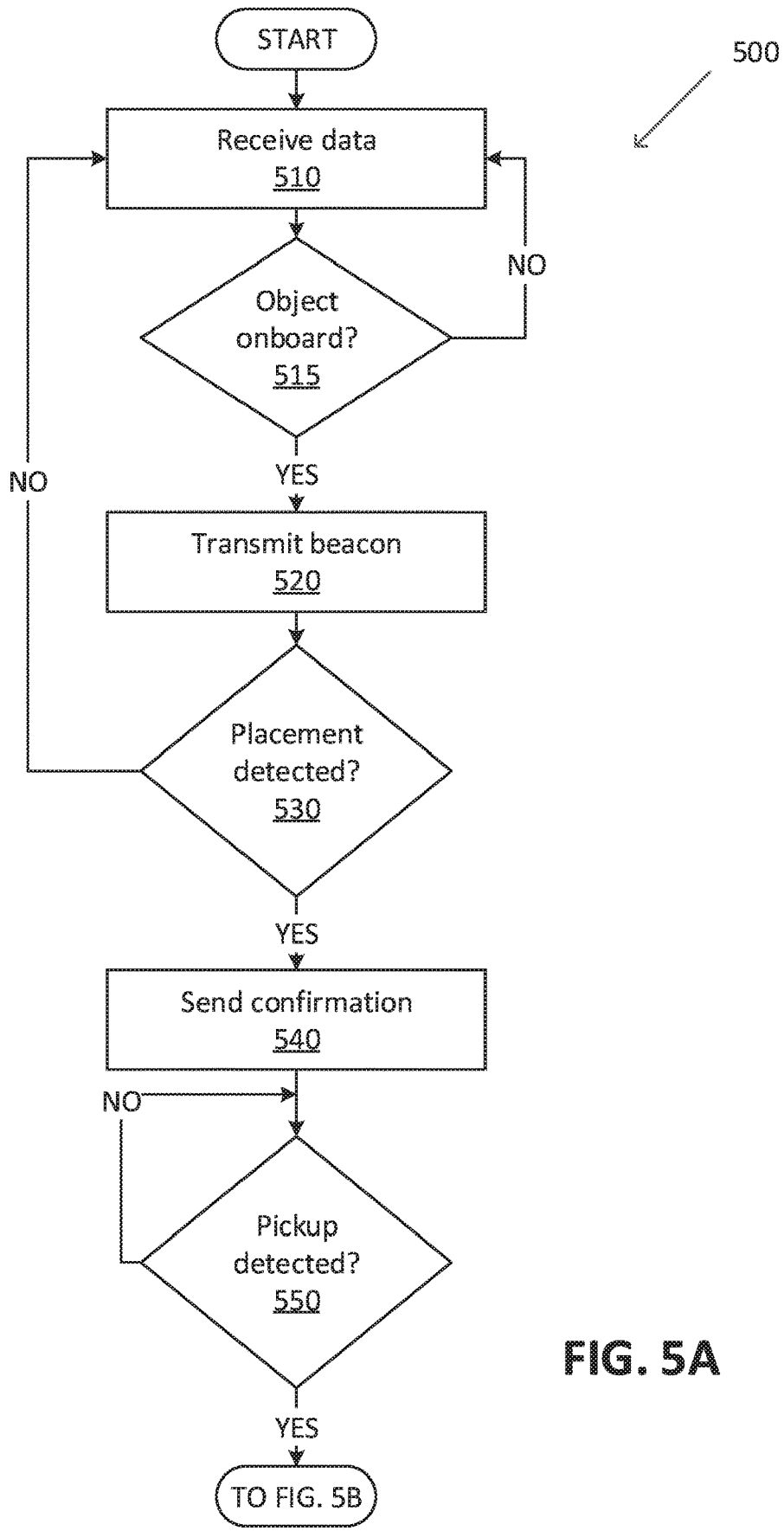
FIGS. 5A-5B are a flowchart of an exemplary process for a mat computer sending instructions to a vehicle and a remote computer.
Figure 5B:
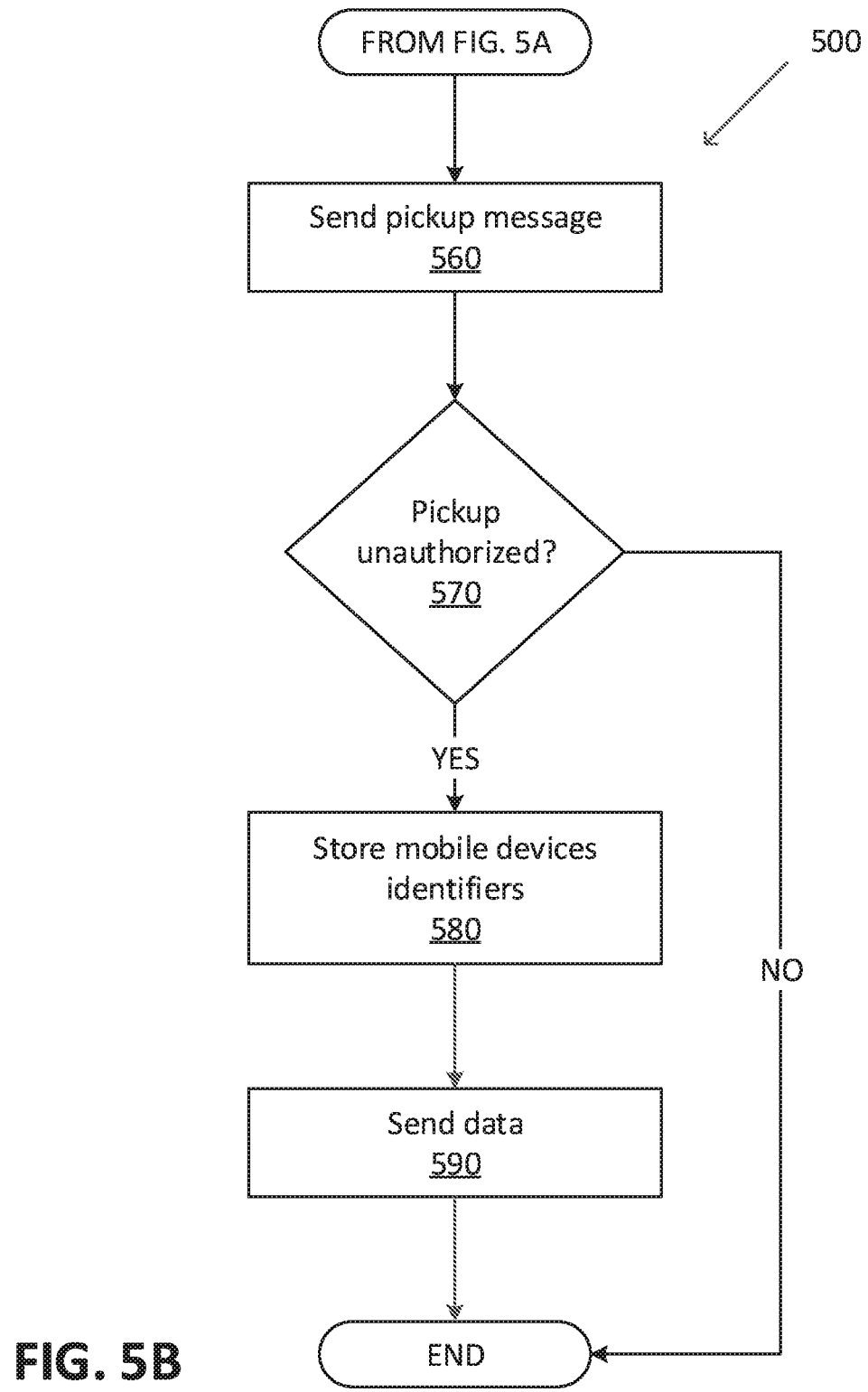

FIGS. 5A-5B are a flowchart of an exemplary process 500 for a mat 135 computer 165 sending instructions to a vehicle 100 and/or a remote computer 155. The mat 135 computer 165 may be programmed to execute blocks of the process 500.

With reference to FIG. 5A, the process 500 begins in a block 510, in which the mat 135 computer 165 receives data from a vehicle 100, e.g., via the network 160. For example, the computer 165 may be programmed to receive a beacon from the vehicle 100 computer 110 via the mat 135 transceiver 170. The received beacon may include a list of objects 220 out for delivery in the vehicle 100. The list may include objects 220 data such as destination addresses, tracking number, etc. Additionally, the computer 165 may be programmed to receive information from, e.g., the remote computer 155, including a list of expected objects 220, e.g., tracking number of an expected object 220, etc.

Next, in a decision block 515, the computer 165 determines whether the vehicle 100 has an object 220 onboard out for delivery to the mat 135. For example, the computer 165 may be programmed to determine, based on the transmitted beacon from the vehicle 100 and the received information from the remote computer 155, whether the vehicle 100 transports an object 220 for the mat 135. If the computer 165 determines that the vehicle 100 has an object 220 for the mat 135 onboard, then the process 500 proceeds to a block 520; otherwise the process 500 returns to the block 510.

In a block 520, the computer 165 transmits a beacon to the vehicle 100. In one example, the computer 165 may be programmed to transmit a beacon including mat 135 identifier and/or location coordinates. The computer 165 may be programmed to send a time interval in which the object 220 delivery is expected, e.g., based on availability of an authorized user 320 at the destination to pick up the object 220 from the mat 135. The computer 165 may be programmed to send predetermined route information to the vehicle 100, e.g., including navigation instructions to navigate a delivery of the object 220 within an area 420 around the destination address. In another example, although not shown in FIG. 5A, the computer 165 may be programmed to broadcast a beacon periodically, e.g., every 5 seconds, to all vehicles 100 that may receive it. The broadcasted beacon may include the mat 135 identifier and/or location coordinates, and an identifier of an expected object 220.

Next, in a decision block 530, the computer 165 determines whether the object 220 is placed on the mat 135 receiving surface 210. For example, the computer 165 may be programmed to detect the placement based on data received from the mat 135 sensors 175 (e.g., weight data), the camera 230 (e.g., image data), the transceiver 170 (e.g., RFID code), etc. If the computer 165 detects the object 220 placement, then the process 500 proceeds to a block 540; otherwise the process 500 returns to the block 510.

In the block 540, the computer 165 transmits a delivery confirmation message, e.g., to the remote computer 155, an authorized user 310 mobile phone 320, etc. The confirmation message may include size, shape, weight, picture, etc. of the delivered object 220. Additionally, the computer 165 may be programmed to actuate the mat 135 light 180 to illuminate, e.g., for a predetermines time.

Next, in a decision block 550, the computer 165 determines whether the object 220 is picked up from the mat 135. For example, the computer 165 may be programmed to detect the pickup of the object 220 based on data received from the mat 135 sensors 175, the camera 230, etc. If the computer 165 determines that the object 220 is picked up, then the process 500 proceeds to a block 560 (see FIG. 5B); otherwise the process 500 returns to the decision block 550.

With reference to FIG. 5B, in the block 560, the computer 165 sends a pick-up message, e.g., to the remote computer 155, the authorized user 310 mobile device 320, etc.

Next, in a decision block 570, the computer 165 determines whether the pickup was authorized. For example, the computer 165 may be programmed to determine whether the pickup was authorized based on determining whether an authorized user 310 picked up the object 220, e.g., using facial recognition techniques, voice recognition, etc. If the computer 165 determines that an unauthorized user 310 picked up the object 220, the process 500 proceeds to a block 580; otherwise the process 500 ends, or alternatively returns to the block 510, although not shown in FIGS. 5A-5B.

In the block 580, the computer 165 receives and stores identifiers of mobile devices 320 within a predetermined distance of the mat 135. Additionally, the computer 165 may be programmed to receive and store image data from the camera 230, e.g., including an image of the unauthorized user 310.

Next, in a block 590, the computer 165 sends data including detection of unauthorized pickup of the object 220. The computer 165 may be programmed to send image data of the unauthorized user 310 that picked up the object 220, and/or stored mobile devices 320 identifiers to a remote computer 155 and/or an authorized user 310 mobile device 320.

Following the block 590, the process 500 ends.

Figure 6:
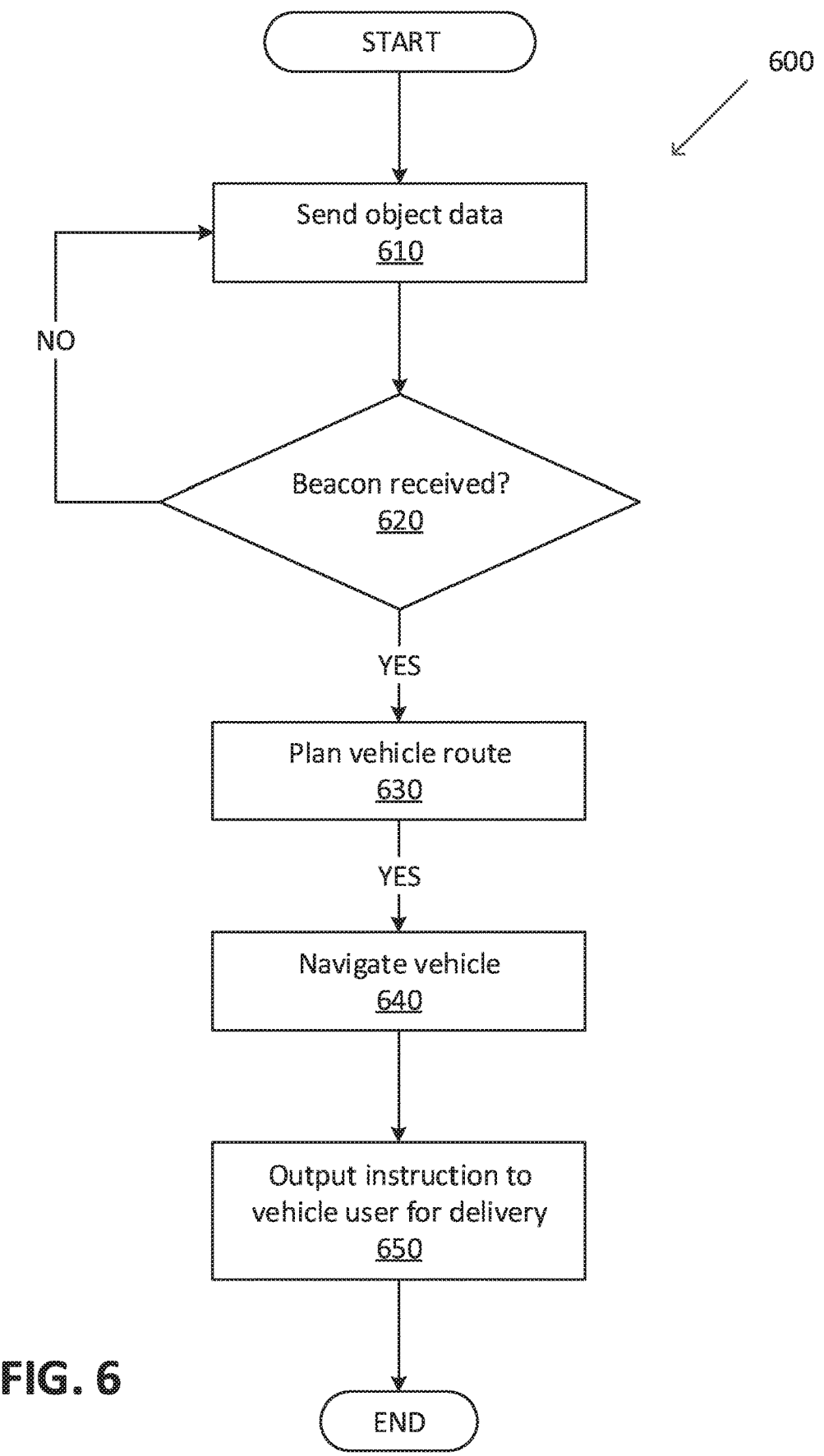
FIG. 6 is a flowchart of an exemplary process for a vehicle receiving control commands from the mat.

FIG. 6 is a flowchart of an exemplary process 600 for a vehicle 100 receiving control commands from the mat 135. The vehicle 100 computer 110 may be programed to execute blocks of the process 600.

The process 600 beings in a block 610, in which the vehicle 100 computer 110 sends objects 220 data. For example, the object 220 data may include a list of objects 220 onboard in the vehicle 100 for delivery. The list may include an identifier such as a tracking number, an associated delivery address, etc., for each of the objects 220.

Next, in a decision block 620, the computer 165, determines whether a beacon is received that is associated with an object 220 onboard in the vehicle 100. In one example, the computer 110 may be programmed to determine whether a beacon is received for an onboard object 220 based on a list of onboard objects 220 and the received beacon from the mat 135. If the computer 110 determines that the beacon associated with an object 220 onboard of the vehicle 100 is received, then the process 600 proceeds to a block 630; otherwise the process 600 returns to the block 610.

In the block 630, the computer 110 plans a delivery route for the vehicle 100. For example, the computer 110 may be programmed to plan the route such that the vehicle 100 the object 220 is delivered with a time interval included in the received beacon. In another example, the computer 110 may be programmed to plan the route based on the received predetermine route included in the received beacon.

Next, in a block 640, the computer 110 navigates the vehicle 100 based on the planned route. For example, the computer 110 actuates the vehicle 100 actuators 115 to follow the planed route. The computer 165 may be programmed to navigate the vehicle 100 to a nearest location 450 to the destination that is accessible by the vehicle 100.

Next, in a block 650, the computer 110 outputs instructions, e.g., via the HMI 125, to the vehicle 100 user, e.g., including a route 410b information to access the mat 135. Additionally or alternatively, the computer 110 may be programmed to operate a robot to carry the object 220 from the vehicle 100, follow the path 410b, and place the object on the mat 135 receiving surface 210.

Following the block 650 the process 600 ends, or alternatively returns to the block 610, although not shown in FIG. 6.

The article "a" modifying a noun should be understood as meaning one or more unless stated otherwise, or context requires otherwise. The phrase "based on" encompasses being partly or entirely based on.

Computing devices as discussed herein generally each include instructions executable by one or more computing devices such as those identified above, and for carrying out blocks or steps of processes described above. Computer-executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media. A file in the computing device is generally a collection of data stored on a computer readable medium, such as a storage medium, a random access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH, an EEPROM, any other memory chip or cartridge, or any other medium from which a computer can read.

With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of systems and/or processes herein are provided for the purpose of illustrating certain embodiments, and should in no way be construed so as to limit the disclosed subject matter.

Accordingly, it is to be understood that the present disclosure, including the above description and the accompanying figures and below claims, is intended to be illustrative and not restrictive. Many embodiments and applications other than the examples provided would be apparent to those of skill in the art upon reading the above description. The scope of the invention should be determined, not with reference to the above description, but should instead be determined with reference to claims appended hereto and/or included in a non-provisional patent application based hereon, along with the full scope of equivalents to which such claims are entitled. It is anticipated and intended that future developments will occur in the arts discussed herein, and that the disclosed systems and methods will be incorporated into such future embodiments. In sum, it should be understood that the disclosed subject matter is capable of modification and variation.

The invention claimed is:

1. A mat, comprising:
a receiving surface;
a transceiver; and
a computer, programmed to:
cause the transceiver to transmit a beacon, including one or both of a mat identifier and location, upon detecting an approaching delivery vehicle;
upon detecting placement of an object on the receiving surface, transmit a confirmation message;
after detecting pickup of the object from the receiving surface receive, via the transceiver, a wireless signal including an identifier of a mobile device;
determine a presence of the mobile device within a predetermined distance of the mat; and
store the identifier of the mobile device upon determining that the object is picked up.

2. The mat of claim 1, wherein the computer is further programmed to, upon detecting the pickup of the object from the receiving surface, transmit a pickup message.

3. The mat of claim 2, wherein the pickup message indicates that the pickup of the object was or was not authorized.

4. The mat of claim 3, wherein the computer is further programmed to determine that the pickup of the object is authorized based on at least one of image data including an authorized user and received wireless data indicating that an authorized wireless sender is within a predetermined distance of the mat.

5. The mat of claim 1, wherein the transmitted beacon further includes data including a time interval in which a delivery of the object is expected.

6. The mat of claim 1, wherein the confirmation message includes at least one of a size, shape, weight, identification number, and image of the object.

7. The mat of claim 1, wherein the transmitted beacon further includes route information to access the mat.

8. The mat of claim 1, wherein the computer is further programmed to identify and store the mat location data based on location coordinates received from a remote computer.

9. The mat of claim 1, further comprising a mat light, wherein the computer is further programmed to actuate a mat light to illuminate upon placing the object on the mat.

10. The mat of claim 1, wherein the computer is further programmed to transmit the beacon, including one or both of a second mat identifier and location, upon detecting an approaching delivery vehicle.

11. A method, comprising:
causing a transceiver of a mat to transmit a beacon, including one or both of a mat identifier and location, upon detecting an approaching delivery vehicle;
upon detecting placement of an object on a receiving surface of the mat, transmitting a confirmation message;
after detecting pickup of the object from the receiving surface receiving, via the transceiver, a wireless signal including an identifier of a mobile device;
determining a presence of the mobile device within a predetermined distance of the mat; and
storing the identifier of the mobile device upon determining that the object is picked up.

12. The method of claim 11, further comprising transmitting a pickup message, upon detecting the pickup of the object from the receiving surface.

13. The method of claim 12, wherein the pickup message indicates that the pickup of the object was or was not authorized.

14. The method of claim 13, further comprising determining that the pickup of the object is authorized based on at least one of image data including an authorized user and received wireless data indicating that an authorized wireless sender is within a predetermined distance of the mat.

15. The method of claim 11, wherein the transmitted beacon further includes data including a time interval in which a delivery of the object is expected.

16. The method of claim 11, wherein the confirmation message includes at least one of a size, shape, weight, identification number, and image of the object.

17. The method of claim 11, wherein the transmitted beacon further includes route information to access the mat.

18. The method of claim 11, further comprising identifying and storing the mat location data based on location coordinates received from a remote computer.

* * * * *